United States Patent
Stewart

(10) Patent No.: US 11,922,309 B2
(45) Date of Patent: *Mar. 5, 2024

(54) APPARATUS AND METHODS FOR STATUS MANAGEMENT OF IMMUTABLE SEQUENTIAL LISTING RECORDS FOR POSTINGS

(71) Applicant: MY JOB MATCHER, INC., Austin, TX (US)

(72) Inventor: Arran Stewart, Austin, TX (US)

(73) Assignee: MY JOB MATCHER, INC.

( * ) Notice: Subject to any disclaimer, the term of this patent is extended or adjusted under 35 U.S.C. 154(b) by 7 days.

This patent is subject to a terminal disclaimer.

(21) Appl. No.: 17/894,465

(22) Filed: Aug. 24, 2022

(65) Prior Publication Data

US 2023/0289589 A1 Sep. 14, 2023

Related U.S. Application Data

(63) Continuation of application No. 17/690,546, filed on Mar. 9, 2022, now Pat. No. 11,461,652.

(51) Int. Cl.
*H04L 9/40* (2022.01)
*G06N 3/08* (2023.01)
(Continued)

(52) U.S. Cl.
CPC .............. *G06N 3/08* (2013.01); *H04L 9/0643* (2013.01); *H04L 9/3247* (2013.01)

(58) Field of Classification Search
CPC ........ G06N 3/08; H04L 9/0643; H04L 9/3247
See application file for complete search history.

(56) References Cited

U.S. PATENT DOCUMENTS 10,318,926 B2 6/2019 Champaneria
10,318,927 B2 6/2019 Champaneria
(Continued)

FOREIGN PATENT DOCUMENTS

CN 111709714 A 9/2020

OTHER PUBLICATIONS

Design and Implementation of Recruitment System Based on Blockchain; Feb. 2020 Chong.

*Primary Examiner* — Ghodrat Jamshidi
(74) *Attorney, Agent, or Firm* — Caldwell Intellectual Property Law

(57) ABSTRACT

An apparatus for status management of immutable sequential listing records for postings is provided. Apparatus may include at least a processor and a memory communicatively connected to the processor. The memory may contain instructions configuring the at least a processor to receive a posting wherein the posting is stored on an immutable sequential listing and includes a description. The processor generates a status score for the posting as a function of activities related to the posting, wherein generating the status score for the posting includes training a machine learning model using training data. The machine learning model receives at least activities related to the posting as input and outputs the status score. The processor compares the status score to a threshold value and updates the description of the posting on the immutable sequential listing as a function of the comparison between the status score and the threshold value.

20 Claims, 7 Drawing Sheets

(51) Int. Cl.
  *H04L 9/06*  (2006.01)
  *H04L 9/32*  (2006.01)

(56) References Cited

U.S. PATENT DOCUMENTS

| | | |
|---|---|---|
| 10,832,219 B2 | 11/2020 | Jersin |
| 11,010,720 B2 | 5/2021 | Chakraborty |
| 11,108,725 B1 * | 8/2021 | Chung .................... G06N 3/08 |
| 11,222,310 B2 | 1/2022 | Janapareddy |
| 11,316,808 B1 * | 4/2022 | Eidelman ................ H04L 51/52 |
| 2018/0181662 A1 * | 6/2018 | Mashiach ............ G06Q 10/101 |
| 2018/0181873 A1 * | 6/2018 | Chen .................... H04L 51/214 |
| 2019/0050813 A1 * | 2/2019 | Guo .................. G06Q 10/1053 |
| 2019/0114593 A1 | 4/2019 | Champaneria |
| 2020/0020447 A1 * | 1/2020 | Generoso ............... G16H 50/70 |
| 2020/0410428 A1 * | 12/2020 | Yan .......................... G06N 7/01 |
| 2021/0012267 A1 | 1/2021 | Fawaz |
| 2021/0073255 A1 * | 3/2021 | Trillo Vargas ........ G06F 16/353 |
| 2021/0073737 A1 * | 3/2021 | Flynn ....................... G06N 5/04 |
| 2021/0089603 A1 | 3/2021 | Abbasi Moghaddam |
| 2021/0256478 A1 | 8/2021 | Hood |
| 2021/0383309 A1 * | 12/2021 | Lamoncha .......... G06Q 10/1053 |

* cited by examiner

APPARATUS AND METHODS FOR STATUS MANAGEMENT OF IMMUTABLE SEQUENTIAL LISTING RECORDS FOR POSTINGS

CROSS-REFERENCE TO RELATED APPLICATIONS

This application is a continuation of U.S. Nonprovisional application Ser. No. 17/690,546, filed on Mar. 9, 2022, and entitled "APPARATUS AND METHODS FOR STATUS MANAGEMENT OF IMMUTABLE SEQUENTIAL LISTING RECORDS FOR POSTINGS," the entirety of which is incorporated herein by reference.

FIELD OF THE INVENTION

The present invention generally relates to the field of immutable sequential listing records. In particular, the present invention is directed to apparatus and methods for status management of immutable sequential listing records for postings.

BACKGROUND

Postings can often become stagnant and fail to attract an optimum quality and number of users. Descriptions of postings attract some users and repel other users. However, it can be difficult to monitor and manage a large number of positions.

SUMMARY OF THE DISCLOSURE

In an aspect of the present disclosure an apparatus for status management of immutable sequential listing records for postings. Apparatus includes at least a processor communicatively connected to a user device, and a memory communicatively connected to the processor, the memory containing instructions configuring the at least a processor to receive a posting that includes a description. Processor may also be configured to store the posting on an immutable sequential listing. Processor may also be configured to generate a status score for the posting as a function of activities. Generating the status score for the posting includes training a machine-learning model using training data, wherein the training data includes activities inputs and corresponding status scores outputs. Generating the status score also includes generating the status score using the machine-learning model. Processor is also configured to compare the status score to a threshold value. Processor is also configured to update the description of the posting on the immutable sequential listing as a function of the comparison between the status score and the threshold value.

In another aspect of the present disclosure, a method for status management of immutable sequential listing records for postings. The method includes receiving, by a processor, a posting that includes a description The method also includes storing, by the processor, the post on an immutable sequential listing. The method also includes generating, by the processor, a status score for the posting as a function of activities. Generating the status score for the posting includes training a machine-learning model using training data, wherein the training data includes activities related to a plurality of postings and corresponding status scores, and generating the status score using the machine-learning model, wherein the machine learning model receives at least the activities related to the posting as input and outputs the status score. The method also includes comparing, by the processor, the status score to a threshold value. The method also includes updating, by the processor, the description of the posting on the immutable sequential listing as a function of the comparison between the status score and the threshold value.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
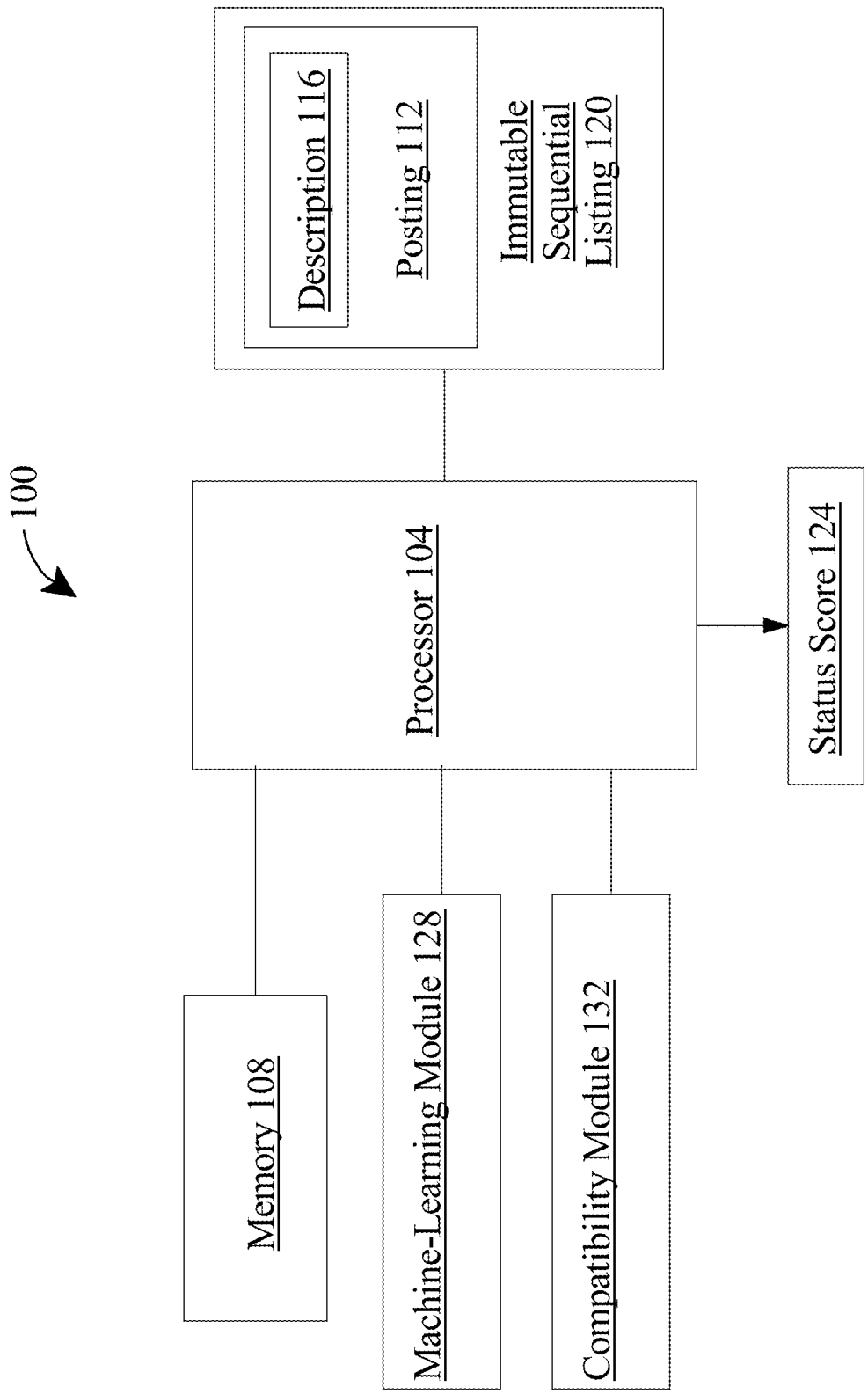
FIG. 1 is a block diagram of an embodiment of an apparatus for status management of immutable sequential listing records for postings.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for status management of immutable sequential listing records for postings. In an embodiment, an apparatus includes at least a processor and a memory communicatively connected to the processor. The memory may contain instructions configuring the at least a processor to receive a posting wherein the posting is stored on an immutable sequential listing and includes a description. The processor generates a status score for the posting as a function of activities related to the posting, wherein generating the status score for the posting includes training a machine learning model using training data, wherein the training data includes activities related to a plurality of postings and corresponding status scores. The machine learning model generates the status score using the machine learning model, wherein the machine learning model receives at least activities related to the posting as input and outputs the status score. The processor compares the status score to a threshold value and updates the description of the posting on the immutable sequential listing as a function of the comparison between the status score and the threshold value. The processor may further compare the status score to a threshold value and update a description of the posting on the immutable sequential listing as a function of the comparison between the status score and the threshold value. Changing a posting's designation, such as from permanent designation to temporary designation or from temporary designation to permanent designation may increase user traffic by drawing more demographics of users to view the posting. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Now referring to FIG. 1, an apparatus for status management of immutable sequential listing records for postings. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Apparatus 100 may include a memory 108. Memory 108 may be communicatively connected to processor 104 and may be configured to store information and/or datum related to apparatus 100. In one or more embodiments, memory 108 may be communicatively connected to a processor and configured to contain instructions configuring processor to execute any operations discussed in this disclosure. In one or more embodiments, memory 108 may include a storage device, as described further in this disclosure below.

As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, processor 104 may be configured to receive posting 112, wherein posting 112 is stored on immutable sequential listing 120. Processor 104 may be communicatively connected to a network, as discussed above. A "posting," as used in this disclosure, is a communication of a job position for which a prospective employer is seeking or may be seeking one or more candidates to potentially fill the job position. Processor 104 may receive a plurality of postings 112. Processor 104 may be communicatively connected to a computing device and receive posting 112 from the computing device. Processor 104 may receive posting 112 via a network, as described in this disclosure. Processor 104 may store and retrieve posting 112 from a local database and/or remote database. Posting 112 includes a description 116 of the posting 112. A "description", as used in this disclosure, is a characteristic and/or detail of a posting. Description 116 may include information about the employer such as the employer's name and address; compensation such as a salary, an hourly wage, and/or benefits; a title of the job position; geographical location of where the job will be performed and/or whether the job is to be performed remotely; a description of the job position such as a listing of responsibilities, expectations, and/or goals to be accomplished; criteria; and/or the like. Description 116 may identify whether posting 112 includes a temporary designation or a permanent designation. As used in this disclosure, a "temporary designation" is a designation that identifies a job position as a temporary position, and a "permanent designation" is a designation that identifies a job position as a permanent position. Job position may be a position as an employee and/or contractor. Posting 112 may include criteria. As used in this disclosure, "criteria," are skills, accreditations, a minimum grade point average (GPA), degree, major and/or focus of study, and/or experience. Criteria may include requirements and/or preferences. As used in this disclosure, a "requirement" is a criterion that must be satisfied for a prospective employee to be eligible for consideration for a posting. As used in this disclosure, a "preference" is a desired criterion, but it is not required for a prospective employee to be considered for a posting.

Processor 104 may be configured to determine a designation for posting 112 by utilizing a classifier. Training data may be filtered, sorted, and/or selected using one or more supervised and/or unsupervised machine-learning processes and/or models as described in further detail below; such models may include without limitation a training data classifier. Training data may include postings 112 with corresponding designations, such as "permanent designation" or "temporary designation". Training data classifier may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Labels may include, for example, "permanent designation" and "temporary designation". Classifier may output labels based on description of postings 112 such as criteria, level of position, salary range, whether the position is part-time or full-time, and/or the like. Machine-learning module, such as designation module, may generate a classifier using a classification algorithm, defined as a processes whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to user and/or user activity data.

With continued reference to FIG. 1, processor 104 may be configured to post a digitally signed assertion in an immutable sequential listing 120, as discussed with reference to FIG. 4, as discussed below. For example, processor 104 may post posting 112 with description 116 and/or updated posting 112 with updated description 116 on immutable sequential listing 120.

Still referring to FIG. 1, processor 104 is configured to generate a status score 124 for posting 112 as a function of activities related to the posting 112. As used in this disclosure, a "status score" is a score measuring a current success and/or predicted success of a posting, such as a likelihood that an employer of a posting would find an adequate applicant among users who apply to the posting. Status score 124 may include a quantitative score, such as a numerical value, and/or a qualitative score, such as great, good, average, needs improvement, and/or poor. As used in this disclosure, an "activity" related to a posting is an event and/or metric that describes and/or involves a characteristic of a posting. For example, an activity related to a posting may include an amount of users who view a posting, number of users who apply to a posting, number of offers made to users who apply to a posting, duration of time a posting has been viewable and/or on immutable sequential listing 120, type of position, level of position, geographical location of position, and/or the like. Activities related to posting 112 may include an amount of users who applied to the posting 112. Processor 104 may track the number of users who apply to posting 112. In some embodiments, status score 124 may be high if the number of users who apply to posting 112 is high. Status score 124 may be low if there is a low percentage of users who apply to posting 112 among the users who viewed the posting 112. Status score 124 may decrease relative to a duration of time posting 112 has been viewable and/or on immutable sequential listing 120. Status score 124 may be based on the number of users who apply to posting 112 relative to a duration of time posting 112 has been viewable and/or on immutable sequential listing 120. Status score 124 may be high if posting 112 is for a position in a geographical location that generally receives a high amount of applicants, such as New York, NY or Los Angeles, CA.

Still referring to FIG. 1, processor 104 may generate status score 124 utilizing an artificial intelligence technique. Artificial intelligence technique may include one or more algorithms or generate one or more machine-learning modules, such as machine-learning module 128, to generate status score 124. Machine-learning module 128 may include utilizing a classifier and/or a machine-learning model as discussed in reference to FIG. 6. In one or more embodiments, machine-learning module 128 may be generated using training data. Training data may include inputs and corresponding predetermined outputs so that machine-learning module 128 may use the correlations between the provided exemplary inputs and outputs to develop an algorithm and/or relationship that then allows machine-learning module 128 to determine its own outputs for inputs. Training data may contain correlations that a machine-learning process may use to model relationships between two or more categories of data elements. The exemplary inputs and outputs may come from a database, such as score database, or be provided by a user such as a prospective employee, and/or an employer. In other embodiments, machine-learning module 128 may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine-learning module 128 may be generated using training data. Machine-learning module 128 may be trained by the correlated inputs and outputs of training data. Inputs of training data may include postings 112 and/or activities related to the postings 112 including, for example, the numbers of users who viewed postings 112, the numbers of users who applied to postings 112, the number of offers made to users who applied to postings 112, duration of time postings 112 have been viewable and/or on immutable sequential listing 120, types of positions, levels of positions, and/or geographical locations of positions. Training data may include status scores 124 corresponding to the inputs. Training data may be postings 112 and/or activities related to the postings 112 and corresponding status scores 124 that have already been determined whether manually, by machine, or any other method. Training data may include previous outputs such that machine-learning module 128 iteratively produces outputs, thus creating a feedback loop for machine-learning module 128 to learn from previous iterations. Machine-learning module 128 using a machine-learning process may output status score 124 based on input of activities related to posting 112 and training data.

With continued reference to FIG. 1, activities related to posting 112 may include a compatibility score of users. In one or more embodiments, processor 104 may implement a compatibility algorithm or generate a machine-learning module, such as compatibility module 132, to determine a compatibility score between user and posting 112. For the purposes of this disclosure, a "compatibility score" is a measurable value representing a relevancy of a user's characteristics with qualifications and/or criteria of a posting. In one or more non-limiting embodiments, compatibility score may be a quantitative characteristic, such as a numerical value within a set range. For example, a compatibility score may be a "2" for a set range of 1-10, where "1" represents a job position and user having a minimum compatibility and "10" represents job position and user having a maximum compatibility. In other non-limiting embodiments, compatibility score may be a quality characteristic, such as a color coding, where each color is associated with a level of compatibility. In one or more embodiments, if a compatibility score is "low", then a user and a job position are considered to have a minimum compatibility; if a compatibility score is "high", then a user and a job position are considered to have a maximum compatibility. For the purposes of this disclosure, a "compatibility algorithm" is an algorithm that determines the relevancy of a user's characteristics with qualifications of a job position. If user is considering applying to a plurality of job positions, then the compatibility scores between each job position of the plurality of job positions and the user may be ranked so that the user may determine which job position the user is most compatible with of the job positions. Compatibility algorithm may include machine-learning processes that are used to calculate a set of compatibility scores. Compatibility module 132 may be trained by using training data associated with past calculations and/or information for the job position and user, such as data related to past prior compatibility scores; information received from users such as transcripts, resumes, cover letters, audio and video recordings, user profiles on social platforms; postings 112; or any other training data described in this disclosure. Compatibility score may be determined by, for example, if a certain numerical value of employment position data matches user data, where the more employment position data that matches user data, the higher the score and the greater the compatibility between the user and the job position. For example, and without limitation, criteria of postings 112 may include a qualification of requiring a teacher with at least five years of work experience, and user's resume may include seven years of work experience in teaching, then a numerical value representing compatibility score may be increased due to the data correlating, thus indicating user is more compatible for the job position because of the provided user information in the resume. In an embodiment, compatibility algorithm may be received from a remote device. In some embodiments, compatibility algorithm is generated by computing device 104. In one or more embodiments, compatibility algorithm may be generated as a function of a user input.

In one or more embodiments, compatibility module 132 may be used to determine compatibility algorithm or to generate a machine-learning model that may directly calculate compatibility score. In one or more embodiments, a machine-learning model may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that compatibility module 132 may determine an output, such as compatibility score, for an input, such as postings 112 and user resume. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Compatibility score may be consistent with disclosure of compatibility score in U.S. patent application Ser. No. 17/582,087 filed on Jan. 24, 2022, and entitled "DIGITAL POSTING MATCH RECOMMENDATION APPARATUS AND METHODS", which is incorporated by reference herein in its entirety. Processor 104, utilizing machine learning module 128, may be configured to output compatibility score based on training data, user information, and/or posting 112.

Still referring to FIG. 1, processor 104 may compare status score 124 to a threshold value. As used in this disclosure, a "threshold value" is a value, such as a numerical value, that indicates a distinction between at least two ranges of values. Threshold value may indicate when description 116 of posting 112 should be updated, such as changing permanent designation and/or temporary designation. For example, status score 124 below threshold value may indicate that permanent designation of posting 112 and/or temporary designation of the posting 112 should be changed to temporary designation and/or permanent designation, respectively. Threshold value may be predetermined. Threshold value may be adjusted according to employer of posting 112. For example, employer may be reluctant to change description 116 of posting 112, such as changing permanent designation to temporary designation, so may set threshold value at a very low numerical value. Threshold value may include a plurality of threshold values that identify a plurality of ranges of status scores 124 that identify when description 116 should be updated. A first threshold value may indicate that if status score 124 exceeds the first threshold value, then description 116 of posting 112 should be updated, such as updating temporary designation to permanent designation. A second threshold value may indicate that if status score 124 is lower than the second threshold value, then description 116 of posting 112 should be updated, such as updating permanent designation to temporary designation. Processor 104 may be configured to determine threshold value based on directives from employee such as a minimum number of applicants for posting 112 and/or a minimum amount of user who view the posting 112. Processor 104 may be configured to determine threshold value based on criteria of posting 112, such as prohibiting remote working, requiring a PhD, and/or the like.

Still referring to FIG. 1, processor 104 may utilize one or more algorithms or generate one or more machine-learning modules, such as threshold module, to generate threshold value. Threshold module may be generated using training data. Threshold module may be trained by the correlated inputs and outputs of training data. Inputs of training data may include postings 112 and/or activities related to the postings 112 including, for example, the numbers of users who viewed postings 112, the numbers of users who applied to postings 112, the number of offers made to users who applied to postings 112, duration of time postings 112 have been viewable and/or on immutable sequential listing 120; and/or descriptions 116 such as types of positions, levels of positions, criteria, and/or geographical locations of positions. Training data may include threshold values corresponding to the inputs. Training data may be postings 112 and/or activities related to the postings 112 and corresponding thresholds that have already been determined whether manually, by machine, or any other method. Training data may include previous outputs such that threshold module iteratively produces outputs, thus creating a feedback loop for threshold module to learn from previous iterations of threshold module using a machine-learning process may output threshold value based on input of posting 112 and/or activities related to posting 112 and training data.

Still referring to FIG. 1, processor 104 may be configured to update description 116 of posting 112 on immutable sequential listing 120 as a function of the comparison between status score 124 and threshold value. Processor 104 may be configured to post updated description 116 and/or updated posting 112 with the updated description 116 on immutable sequential listing 120. Updating description 116 may include changing designation of posting 112 from permanent designation to temporary designation and/or from temporary designation to permanent designation and posting on immutable sequential listing 120 the posting 112 with description 116 that is updated. In some embodiments, processor 104 may be configured to update criteria in description 116. For example, status score 124 below threshold may trigger requirements of criteria to loosen, such as posting 112 requiring five years' experience may be updated to four years' experience. In some embodiments, description 116 may be updated to change requirements of criteria to preferences of criteria. Conversely, if status score 124 surpasses an upper threshold, criteria may be updated to become more demanding, such as changing a requirement of five years' experience to seven years' experience or changing preferences of criteria to requirements of criteria. Processor 104 may receive input from employer identifying what parts of description 116 the employer would want to update and/or what triggers or thresholds the employer would like to set. In some embodiments, certain activities related to posting 112 may disqualify the posting 112 from its description 116 or select portions of its description 116 potentially being updated, as discussed in this disclosure. Updating description 116 may be based on a level of posting 112. As used in this disclosure, a "level" of posting is an experience level or corporate hierarchy level of a position the posting is for. A level may include entry level positions that require no or little experience; intermediate level for positions that require a few years' experience; senior level, partner, positions that require at least several years' experience, such as managers; officers and executives; and/or the like. For example, certain types and/or levels of position of posting 112, such as high-level positions like officers and executives, may disqualify or preclude the posting 112 from potentially having processor 104 update description 116 of the posting 112 from permanent designation to temporary designation regardless of status score 124. In some embodiments, processor 104 may have access to multiple versions of posting 112 to readily update on immutable sequential listing 120. For example, a first version of posting 112 may include description 116 with permanent designation and a second version of the posting 112 including the description 116 with temporary designation, so processor 104 may readily update the description 116 by posting a corresponding version of the posting 112 on immutable sequential listing 120. Processor 104 may automate updating posting 112 by posting on immutable sequential listing 120 the posting 112 with description 116 that reflects the updated status of the posting 112.

Figure 2:
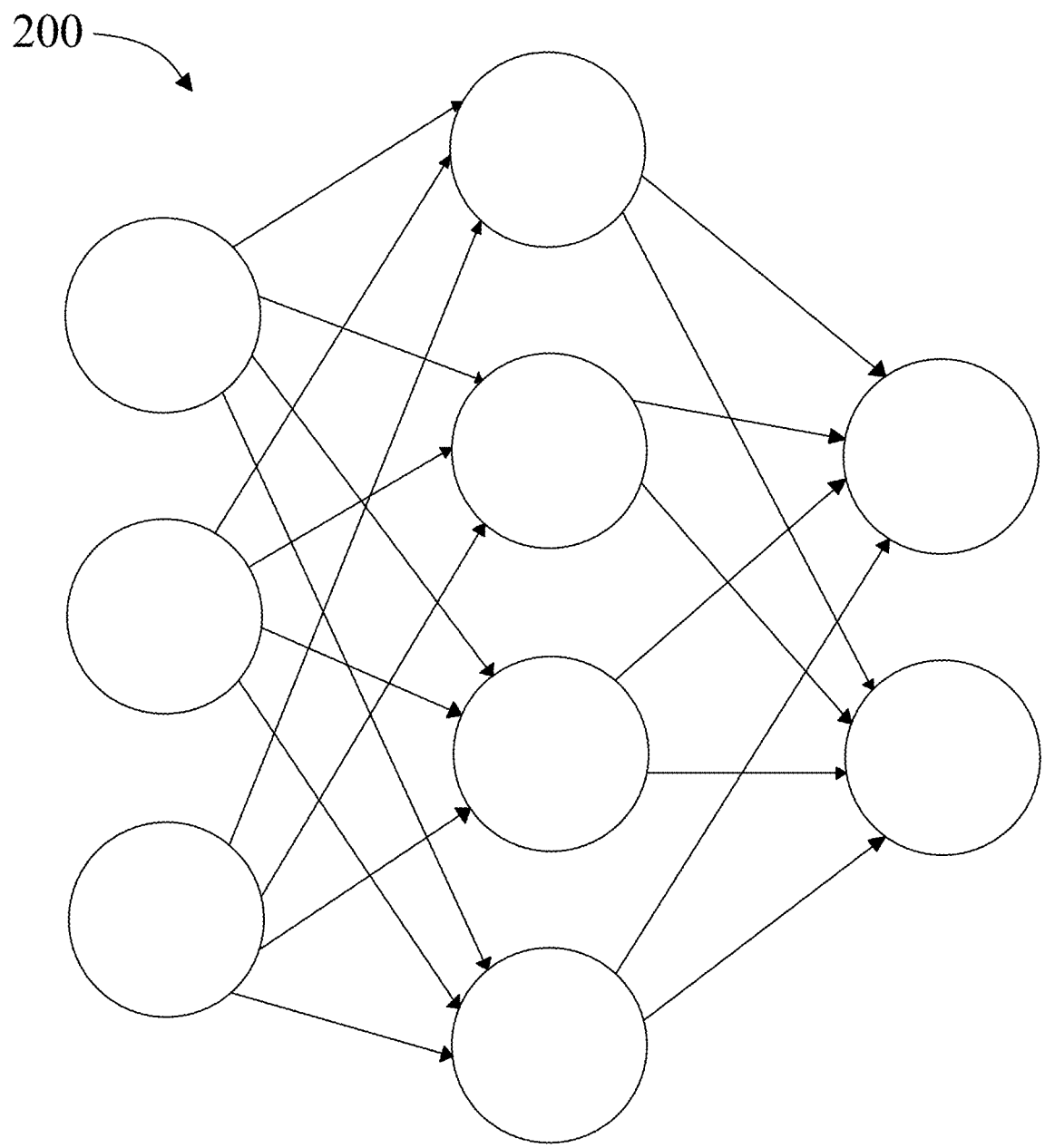
FIG. 2 illustrates an exemplary neural network.

Referring now to FIG. 2, an exemplary embodiment of neural network 200 is illustrated. A neural network 200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 3:
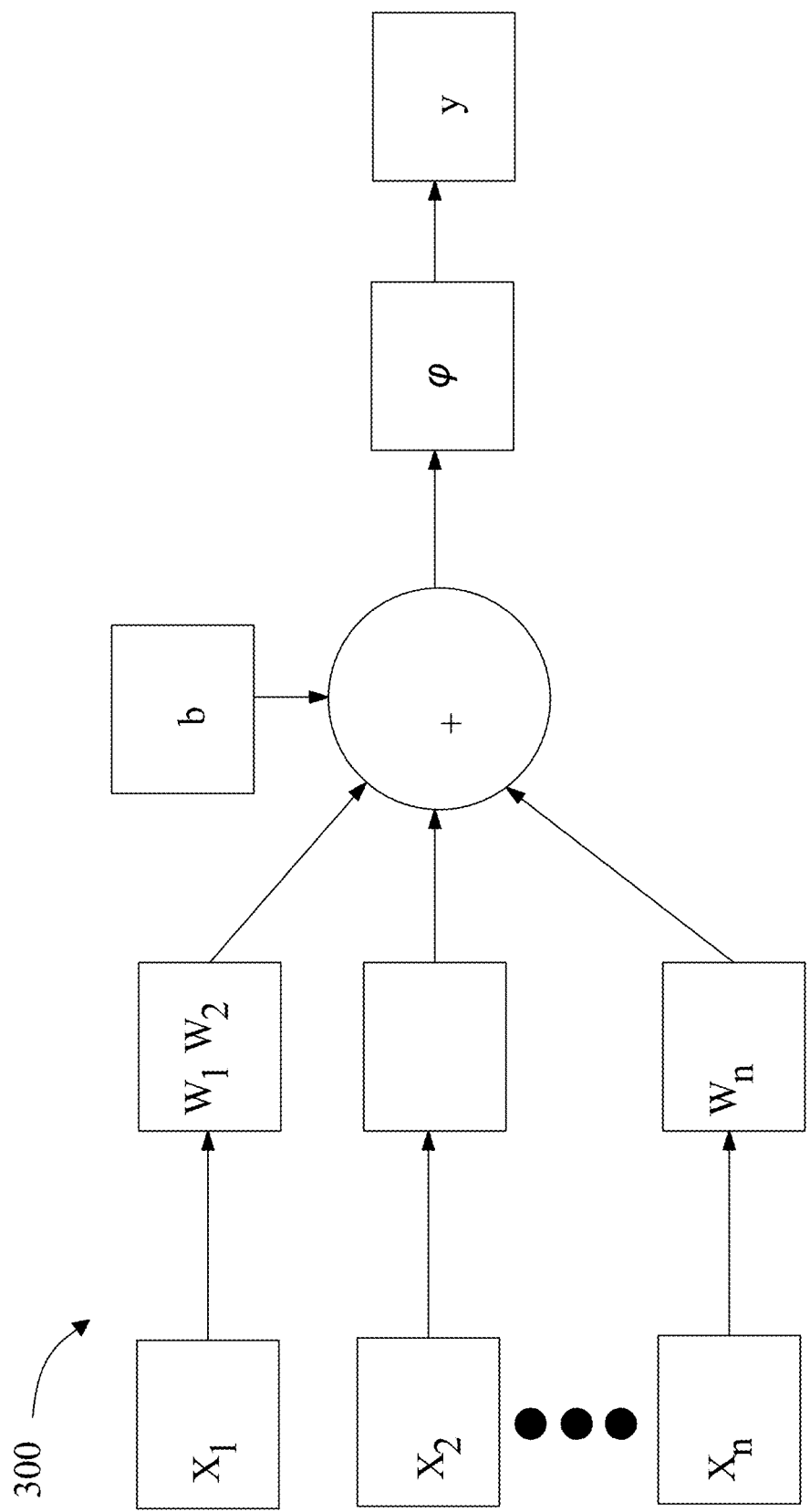
FIG. 3 is a block diagram of an exemplary node.

Referring now to FIG. 3, an exemplary embodiment of a node 300 of a neural network is illustrated. Node 300 may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 4:
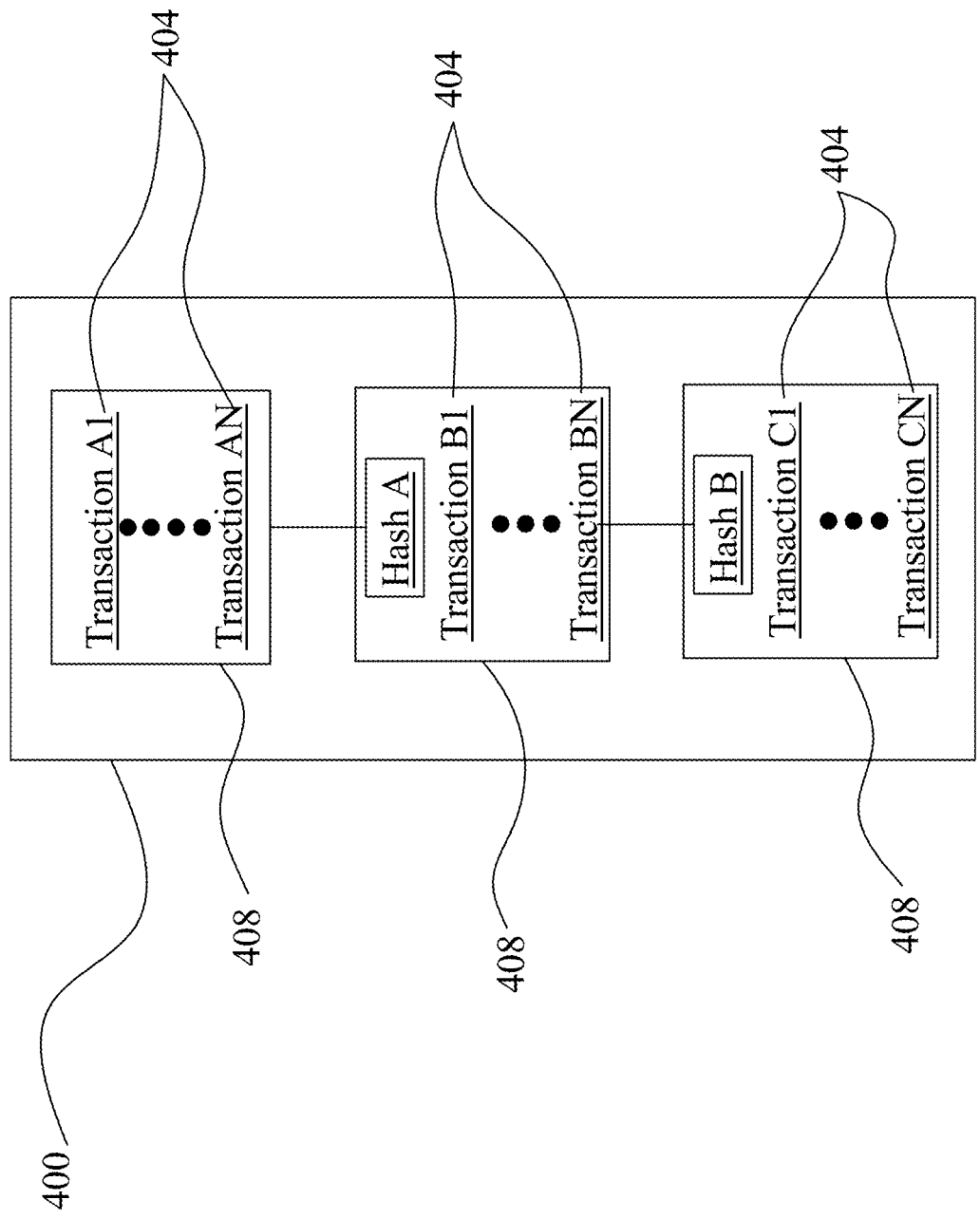
FIG. 4 is a block diagram of an exemplary immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like. Data elements may include, without limitation, one or more at least a digitally signed assertion. In one embodiment, a digitally signed assertion 404 is a collection of textual data signed using a secure proof as described in further detail below; secure proof may include, without limitation, a digital signature. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Still referring to FIG. 4, in some embodiments, an address is a textual datum identifying the recipient of virtual currency or another item of value, such as posting 112, in a digitally signed assertion 404. In some embodiments, address may be linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

In an embodiment, and still referring to FIG. 4 immutable sequential listing 400 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. Posting 112 with description 116, updated posting 112 with updated description 116, and/or status score 124 may be posted on immutable sequential listing 400, such as blockchain. Training data for any machine-learning module discussed in this disclosure may be posted on immutable sequential listing 400, such as blockchain. A master list may be included. Master list may include a hash-table and/or distributed hash table which may be used to locate a requestor-linked data store. For example, a public key associated with a requestor containing location information pertaining to requestor-linked data store may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store when prompted. Using the hashed key, a hash function may compute an index that may suggest where requestor-linked data store may be found. Locating may also be performed by linking the at least an encrypted data record to a digital signature associated with the requestor. Requestor may produce a digital signature, which may then be linked to the at least an encrypted data record and locate to the location of the at least an encrypted data record. When the digital signature is presented, it may contain location information of the at least an encrypted data record and allow access control regulator to locate the precise location of encrypted data record. For example, digital signature may be generated using a public and/or private key linked to requestor which may contain location information of encrypted data record. In an embodiment, encrypted data record may be linked to a requestor key, so that when a requestor key is presented, location of encrypted data record becomes apparent. Locating may also be performed by information that may be contained in data access request. For example, a data access request associated with a user may contain location information of encrypted data record that requestor is attempting to access. When generating a data access request, requestor may specify the location of encrypted data record that may then be transmitted to access control regulator. Additional disclosure pertaining to immutable sequential listing can be found in U.S. patent application Ser. No. 17/486,461 filed on Sep. 27, 2021, and entitled "SYSTEMS AND METHODS FOR SCORE GENRATION FOR APPLICANT TRACKING", the entirety of which in incorporated herein by reference.

With continued reference to FIG. 4, the ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp. Immutable sequential listing 400 and/or any component of the immutable sequential listing 400, such as sub-listing 408 and digitally signed assertions 404, may be validated by processor 104 consistent with disclosure of validation in U.S. patent application Ser. No. 16/698,182 filed on Nov. 27, 2019 and titled "SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT", which is incorporated by reference herein in its entirety.

In some embodiments, and with continued reference to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain may contain a single first sub-listing 408 sometimes known as a "genesis block."

Still referring to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408, protocol may adjust the algorithm to produce the next sub-listing 408 so that it will require more steps; where one sub-listing 408 takes more time for a given set of computing devices to produce the sub-listing 408, protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408. Each sub-listing 408 created in immutable sequential listing 400 may contain a record or at least a posted content describing one or more addresses that receive an incentive, such as virtual currency, as the result of successfully mining the sub-listing 408.

With continued reference to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained in the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Still referring to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Figure 5:
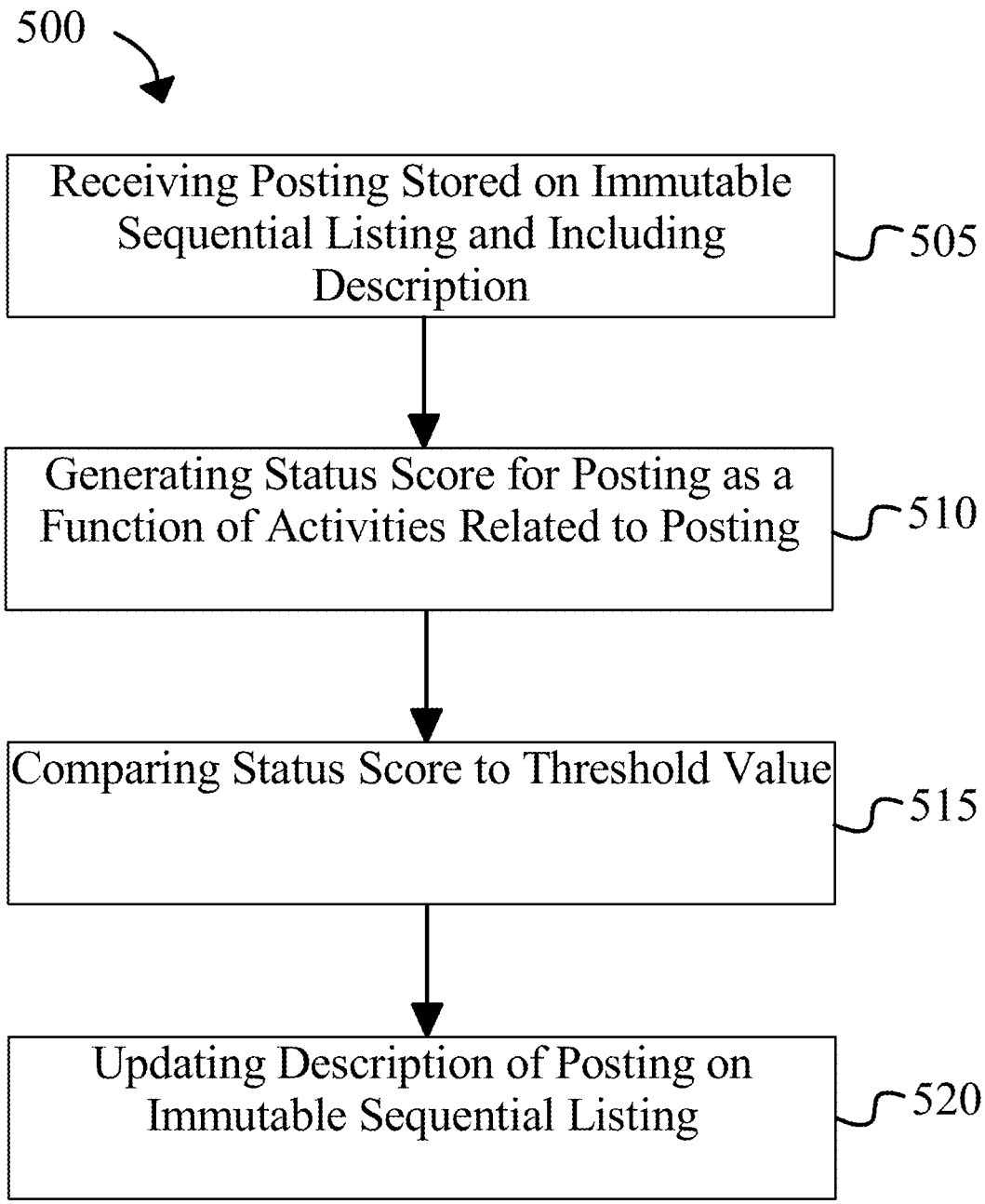
FIG. 5 is a flow diagram of an exemplary method for status management of immutable sequential listing records for postings.

Now referring to FIG. 5, an exemplary embodiment of a method 500 for status management of immutable sequential listing records for postings is illustrated. At step 505, processor receives posting wherein the posting is stored on immutable sequential listing and comprises description; this may be implemented, without limitation, as described above in reference to FIGS. 1-5. Description may identify whether posting comprises temporary designation or permanent designation. Description may include criteria, wherein updating the description comprises changing the criteria of the posting.

At step 510, processor generates status score for posting as a function of activities related to the posting; this may be implemented, without limitation, as described above in reference to FIGS. 1-5. Generating status score includes training machine learning model using training data, wherein the training data includes activities related to plurality of postings and corresponding status scores; and generating the status score using the machine learning model, wherein the machine learning model receives at least the activities related to the posting as input and outputs the status score. Activities related to posting may include an amount of users who applied to the posting, compatibility scores of users who applied to the posting, an amount of users who view the posting, and/or a duration of time the posting has been on immutable sequential listing. Artificial intelligence technique may include utilizing a machine-learning module. Processor, utilizing a machine learning module, may be configured to output compatibility score based on training data, user information, and posting.

At step 515, processor compares status score to threshold value; this may be implemented, without limitation, as described above in reference to FIGS. 1-5. Threshold value may include a plurality of threshold values that identify a plurality of ranges of status scores that identify when the description should be updated.

At step 520, processor updates description of posting on immutable sequential listing as a function of comparison between status score and threshold value; this may be implemented, without limitation, as described above in reference to FIGS. 1-5. Updating description may include changing designation of posting. Updating description may be based on level of posting, wherein certain levels preclude the posting from being updated.

Figure 6:
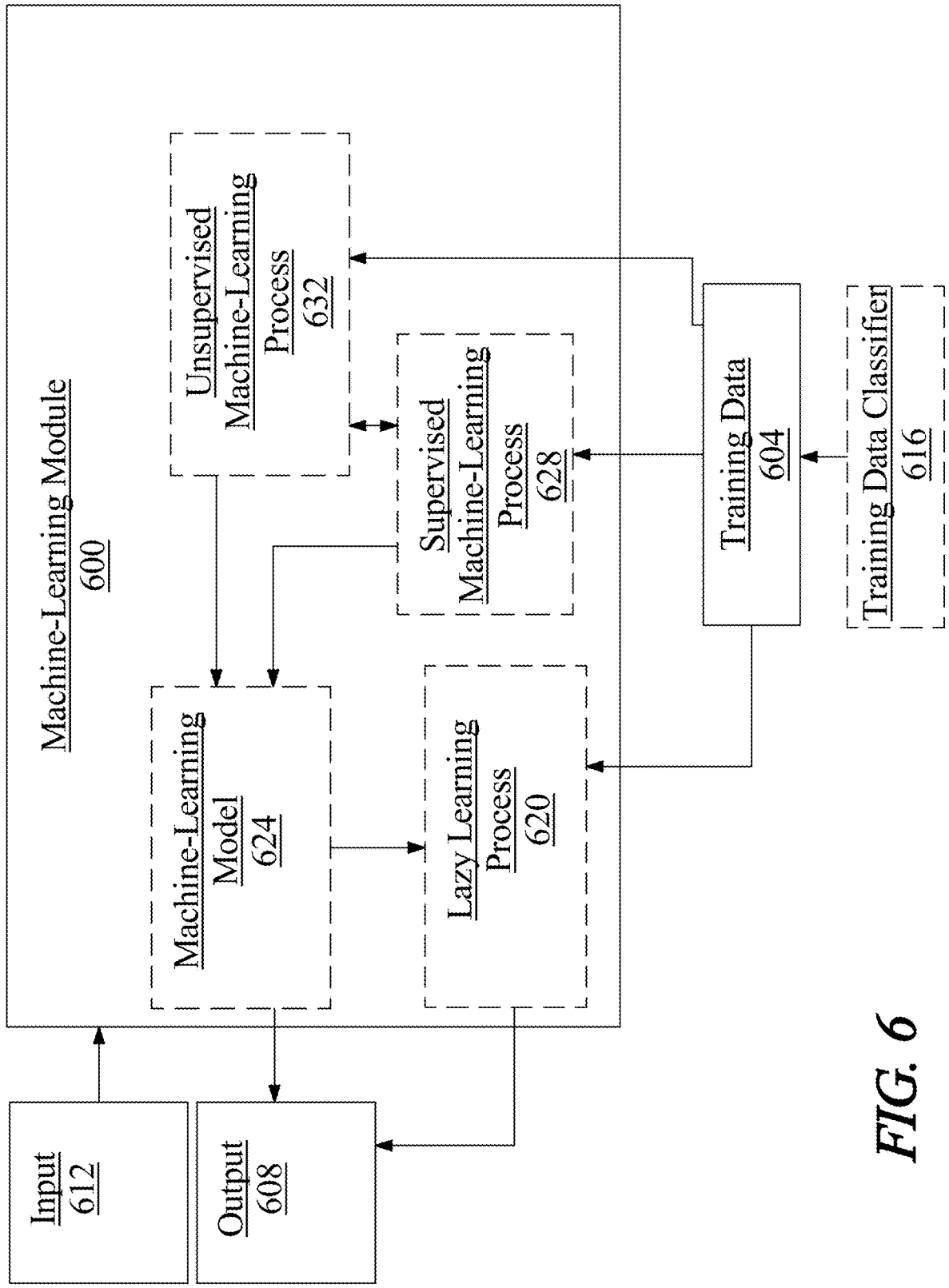
FIG. 6 is a block diagram of exemplary machine-learning processes.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example, input data may include user information such as user identification, and output data may include one or more sets of user activity data.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to user and/or user activity data.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may user information such as user identification as described above as inputs, one or more sets of user activity data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
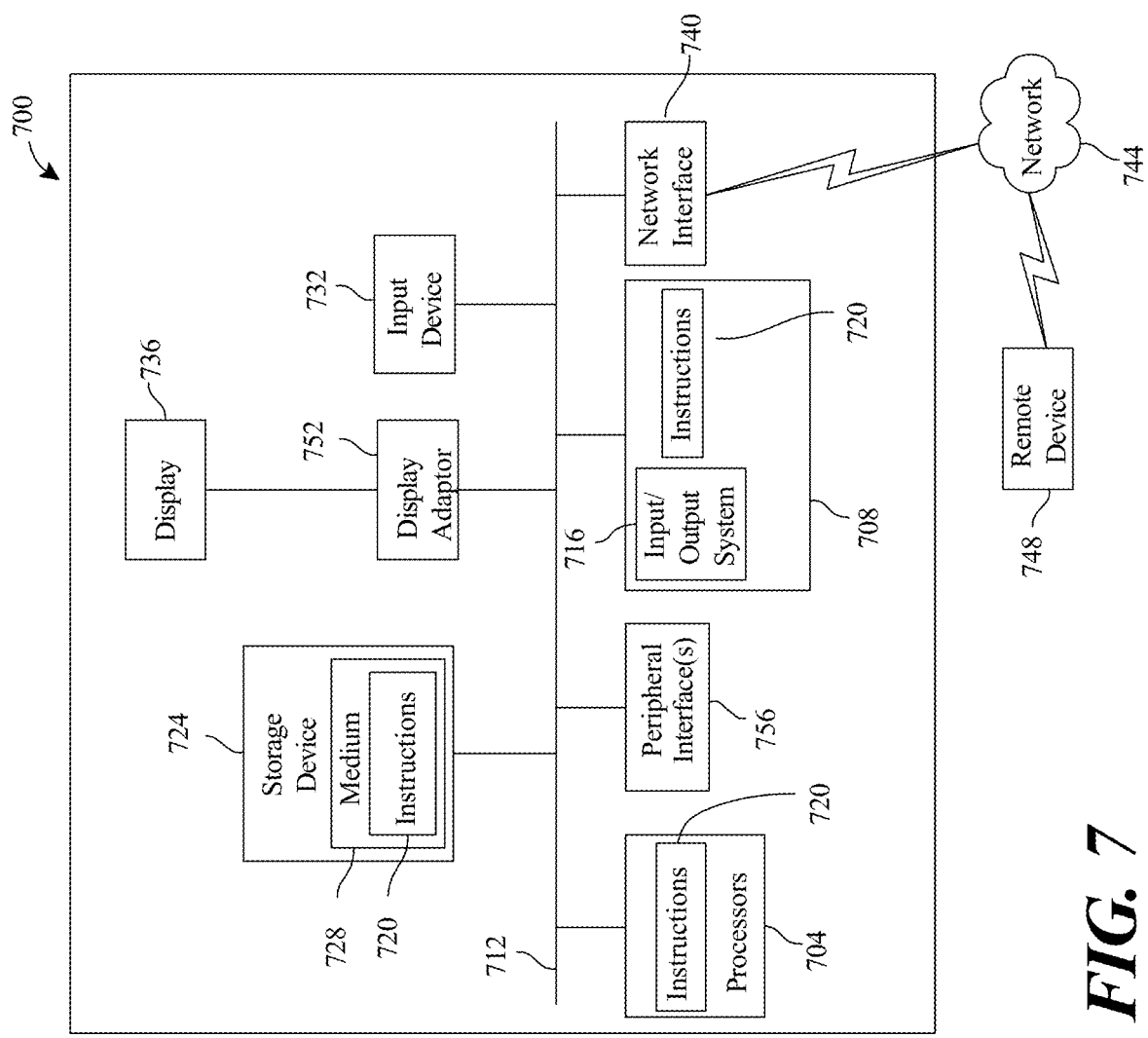
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for status management of immutable sequential listing records for postings, the apparatus comprising:
at least a processor communicatively connected to a user device; and
a memory communicatively connected to the processor, the memory containing instructions configuring the at least a processor to:
receive a posting that comprises a description;
store the posting on an immutable sequential listing;
generate a status score for the posting as a function of activities, wherein generating the status score for the posting comprises:
training a machine-learning model using training data, wherein the training data includes activities inputs and corresponding status scores outputs; and
generating the status score using the machine-learning model;
compare the status score to a threshold value; and
update the description of the posting on the immutable sequential listing as a function of the comparison between the status score and the threshold value.

2. The apparatus of claim 1, wherein:
the description comprises a designation that identifies whether the posting comprises a temporary designation or a permanent designation; and
updating the description comprises changing the designation of the posting.

3. The apparatus of claim 2, wherein:
the threshold value comprises a first threshold and a second threshold;
the description is updated from the temporary designation to the permanent designation if the status score exceeds the first threshold; and
the description is updated from the permanent designation to the temporary designation if the status score is lower than the second threshold.

4. The apparatus of claim 1, wherein the status score comprises a qualitative score associated with a likelihood of a user being hired for the posting.

5. The apparatus of claim 1, wherein the activities comprise a qualitative value representing an amount of users applying to the posting.

6. The apparatus of claim 1, wherein the activities include a duration that a posting has been stored on an immutable sequential listing.

7. The apparatus of claim 1, wherein comparing the status score and the threshold value comprises determining if a value of the status score exceeds the threshold value.

8. The apparatus of claim 1, wherein the activities comprise at least a compatibility score of a user who applied to the posting.

9. The apparatus of claim 8, wherein the processor is configured to determine the compatibility score as a function of user information and the description of the posting.

10. The apparatus of claim 1, wherein the activities comprise an amount of views of the posting by one or more users.

11. The apparatus of claim 1, wherein:
the description includes criteria; and
updating the description comprises changing the criteria of the posting.

12. A method for status management of immutable sequential listing records for postings, the method comprising:
receiving, by a processor, a posting that comprises a description,
storing, by the processor, the post on an immutable sequential listing;
generating, by the processor, a status score for the posting as a function of activities, wherein generating the status score for the posting comprises:
training a machine-learning model using training data, wherein the training data includes activities related to a plurality of postings and corresponding status scores; and
generating the status score using the machine-learning model, wherein the machine learning model receives at least the activities related to the posting as input and outputs the status score;
comparing, by the processor, the status score to a threshold value; and
updating, by the processor, the description of the posting on the immutable sequential listing as a function of the comparison between the status score and the threshold value.

13. The method of claim 12, wherein:
the description comprises a designation that identifies whether the posting comprises a temporary designation or a permanent designation; and
updating the description comprises changing the designation of the posting.

14. The method of claim 12, wherein:
the threshold value comprises a first threshold and a second threshold;

the description is updated from the temporary designation to the permanent designation if the status score exceeds the first threshold; and the description is updated from the permanent designation to the temporary designation if the status score is lower than the second threshold.

15. The method of claim 12, wherein the status score comprises a qualitative score associated with a likelihood of a user being hired for the posting.

16. The method of claim 12, wherein the activities comprise a qualitative value representing an amount of users applying to the posting.

17. The method of claim 12, wherein the activities include a duration that a posting has been stored on an immutable sequential listing.

18. The method of claim 12, wherein comparing the status score and the threshold value comprises determining if a value of the status score exceeds the threshold value.

19. The method of claim 12, wherein the activities comprise at least a compatibility score of a user who applied to the posting.

20. The method of claim 19, further comprising determining, by the processor, the compatibility score as a function of user information and the description of the posting.

* * * * *